(12) United States Patent
Faller et al.

(10) Patent No.: US 6,298,722 B1
(45) Date of Patent: Oct. 9, 2001

(54) ROTARY CAM DRIVEN FREE FALL DROPPING CHAMBER MECHANISM

(75) Inventors: James Faller; Timothy Niebauer; Artyom Vitoucrine, all of Boulder, CO (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 0 days.

(21) Appl. No.: 09/442,734

(22) Filed: Nov. 18, 1999

Related U.S. Application Data

(60) Provisional application No. 60/109,423, filed on Nov. 19, 1998.

(51) Int. Cl.[7] ........................................ G01V 7/14
(52) U.S. Cl. .................................................. 73/382 R
(58) Field of Search ............................. 73/382 R, 382 G

(56) References Cited

U.S. PATENT DOCUMENTS 5,461,914 * 10/1995 Zumberge et al. ................ 73/382 R
6,082,194 * 7/2000 Gladwin ............................ 73/382 G

* cited by examiner

Primary Examiner—John E. Chapman
(74) Attorney, Agent, or Firm—Alfred F Hoyte Esq

(57) ABSTRACT

An improved gravimeter mechanism includes a mass balanced cam having mutually opposed camming surfaces for controlling the free fall of a measuring mass. The cam is attached to a camshaft which turns at a constant rate, the rate being selected so that the drop time appropriate to achieve lift-off of the dropped object together with the time required to return to the start position equals the cam's rotational period. The mutually opposed camming surfaces cooperate to drive both a cart which supports a measuring mass and a compensating mass which is built into the gravimeter mechanism. The cam drives the cart, the measuring mass, and the compensating mass so that the time varying reduction in weight produced when the measuring mass is in free fall is exactly compensated by the compensating mass which is driven by the opposing camming surface. The opposing camming surface is displaced from the lift off region of the camming surface which drives the cart and measuring mass by 180 degrees. The measuring mass contains a mirror element of a Michelson interferometer, and the interferometer produces a signal indicative of the rate of free fall, which is directly proportional to the local gravity.

8 Claims, 5 Drawing Sheets

ROTARY CAM DRIVEN FREE FALL DROPPING CHAMBER MECHANISM

CROSS REFERENCE TO RELATED APPLICATIONS

This application is filed pursuant to Provisional Application Serial No. 60/109,423 filed on Nov. 19, 1998 and entitled, ROTARY CAM DRIVEN FREE FALL DROPPING CHAMBER MECHANISM.

BACKGROUND OF THE INVENTION

1. Field of the Invention

The present invention relates to instruments for measuring gravity. More particularly, the invention relates to a cam mechanism for creating the free fall for a measuring mass of a gravimeter.

2. Description of the Prior Art

A gravimeter is an instrument which measures the local acceleration due to gravity. The variations of the acceleration due to gravity at various points of the surface of the earth, or at various elevations may be used to make determinations of the underlying geologic structure. To accomplish such ends, it is necessary to make extremely small measurements of the acceleration due to gravity with high accuracy, on the order of $10^{-9}$. To this end, typical gravimeters, which are relative instruments (they only measure differences in gravity). have a measuring mass suspended by a spring assembly. Deflection of the measuring mass from a zero position may be sensed by a photo-electric pick-off, and a restoring force generator moves the mass to the zero position, with the required adjusting movements providing an indication of the local gravity. These types of gravimeters suffer from several drawbacks, the most significant of which is that the springs in the spring assembly are subject to variations in their spring constant which affects the accuracy of any measurement made by the system.

Another (and absolute) type of gravimeter measures the free fall rate of a measuring mass to determine the local acceleration due to gravity. The free fall rate of the mass, which is dropped in an evacuated chamber called a dropping chamber, may be determined using various types of photoelectric assemblies such as an interferometer to generate signals from which the free fall rate, and thus the value of acceleration due to gravity may be determined.

Modern absolute gravimeters apply the methods of optical interferometry to the motion of a freely falling test mass containing a corner cube. This corner cube, or optical retro-reflector, serves as a rotation insensitive mirror in a Michelson type of interferometer. The position, and therefore the rate of free fall, of the mass may be accurately monitored by closely observing the optical fringes generated by the motion of the corner cube. A freely falling test mass from which the local acceleration due to gravity can be obtained is created by employing a mechanical apparatus within the dropping chamber. The mechanical apparatus must perform the following functions to create a falling mass from which error free measurements can be made. First the apparatus must have a platform or cart upon which the mass may be stably supported. Second, the cart must be capable of smooth acceleration to a downward velocity sufficient to effect a release of the mass from the cart. Third, the cart must decelerate at a velocity effective to cause a soft catch of the mass. Finally, the cart must lift the mass back to the starting position so that the procedure may be repeated. Prior art gravimeters of the free fall type have created drops of varying lengths using an opto-electronic motor belt drive assembly, with a typical drop length of about 20 cm. The maximum repetition rate is about twenty to thirty repetitions per minute although in practice a repetition rate of about 2 to 3 per minute is common. This allows for settling down of the mechanism after completing a cycle to avoid inaccurate measurements.

These systems suffer from additional drawbacks. The lift-off creating mechanism may impart rotational or other undesired movement to the measuring mass thereby affecting the accuracy of the measurement. Finally, the assemblies are relatively large and heavy, making them difficult for use in the field or in any application where portability is required.

Accordingly, it would be desirable to provide an instrument for measuring the local acceleration due to gravity which does not suffer from the drawbacks of the prior art gravimeters.

SUMMARY OF THE INVENTION

Briefly, the invention comprises an improved gravimeter mechanism having a mass balanced cam with mutually opposed camming surfaces for controlling the free fall of a measuring mass. The cam is attached to a camshaft which turns at a constant rate, the rate being selected so that the drop time appropriate to achieve lift-off of the dropped object together with the time required to return to the start position equals the cam's rotational period. The mutually opposed camming surfaces cooperate to drive both a cart which supports a measuring mass and a compensating mass which is built into the gravimeter mechanism. The cam drives the cart, the measuring mass, and the compensating mass so that the time varying reduction in weight produced when the measuring mass is in free fall is exactly compensated by the compensating mass which is driven by the opposing camming surface. The opposing camming surface is displaced from the lift off region of the camming surface which drives the cart and measuring mass by 180 degrees. The measuring mass contains a mirror element of a Michelson interferometer, and the interferometer produces a signal indicative of the rate of free fall, which is directly proportional to the local gravity.

It is a major object of this invention to provide an improved gravimeter apparatus.

It is another object of this invention to provide an improved mechanism for causing the free fall of an object.

It is another object of the invention to provide an improved mechanism for causing the free fall of an object which utilizes a cam to initiate the free fall of the object, effect release of the object, and provide a soft catch of the object before returning it to the start position.

It is another object of the invention to provide an improved mechanism for causing the free fall of an object which includes a compensating mass for canceling any weight change caused by the acceleration and the free fall of the object.

It is another object of the invention to provide an improved mechanism for causing the free fall of an object which utilizes a double cam for causing free fall of the object as well as effecting an opposing weight compensating motion of a compensating mass.

It is another object of the invention to provide an improved mechanism for causing the free fall of an object which is capable of providing up to three measurements per second.

Finally, it is a general goal of the invention to provide improved elements and arrangements thereof in an apparatus for the purposes described which is fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
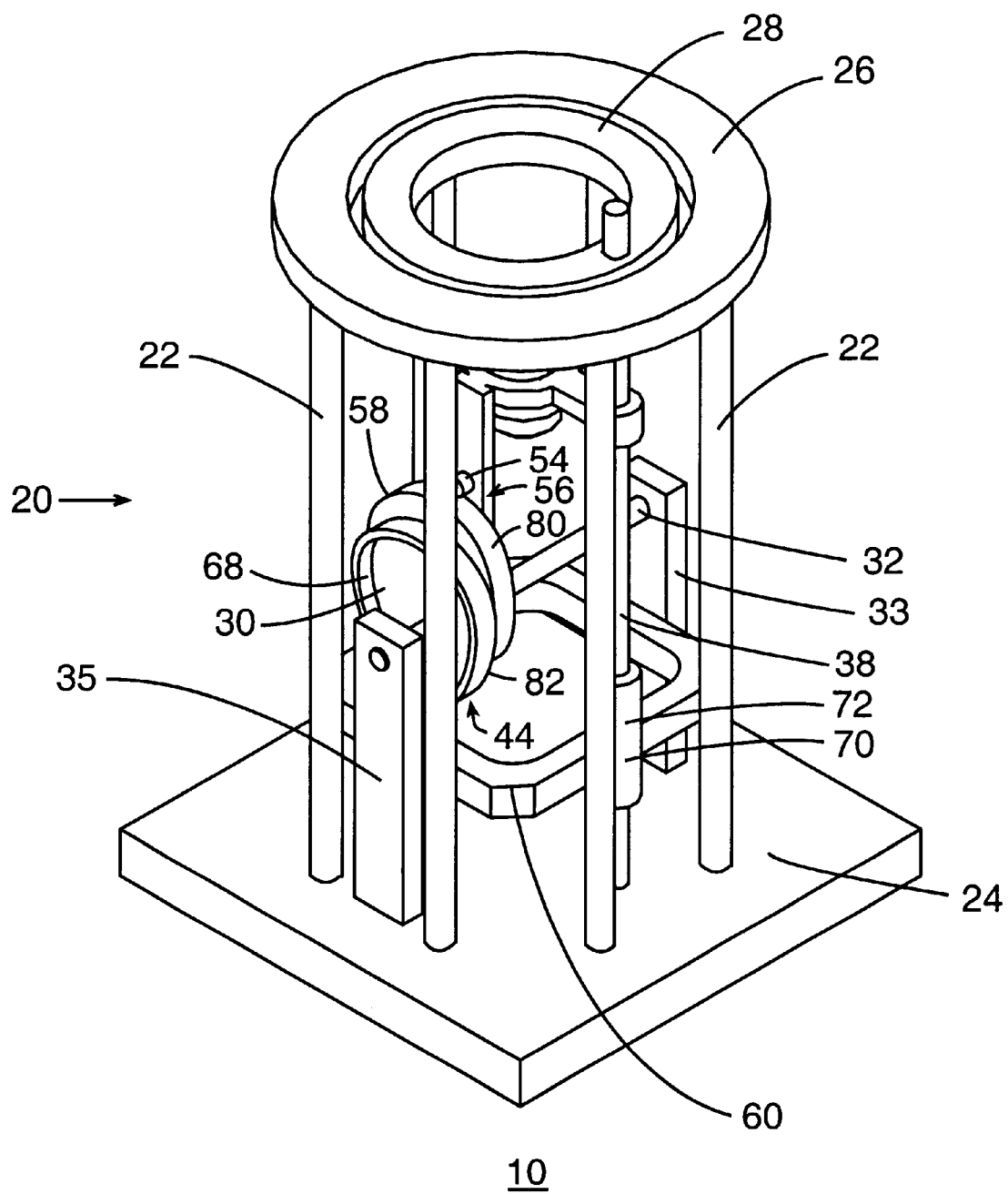
FIG. 1 is a perspective view of the gravimeter assembly of the present invention.
Figure 2:
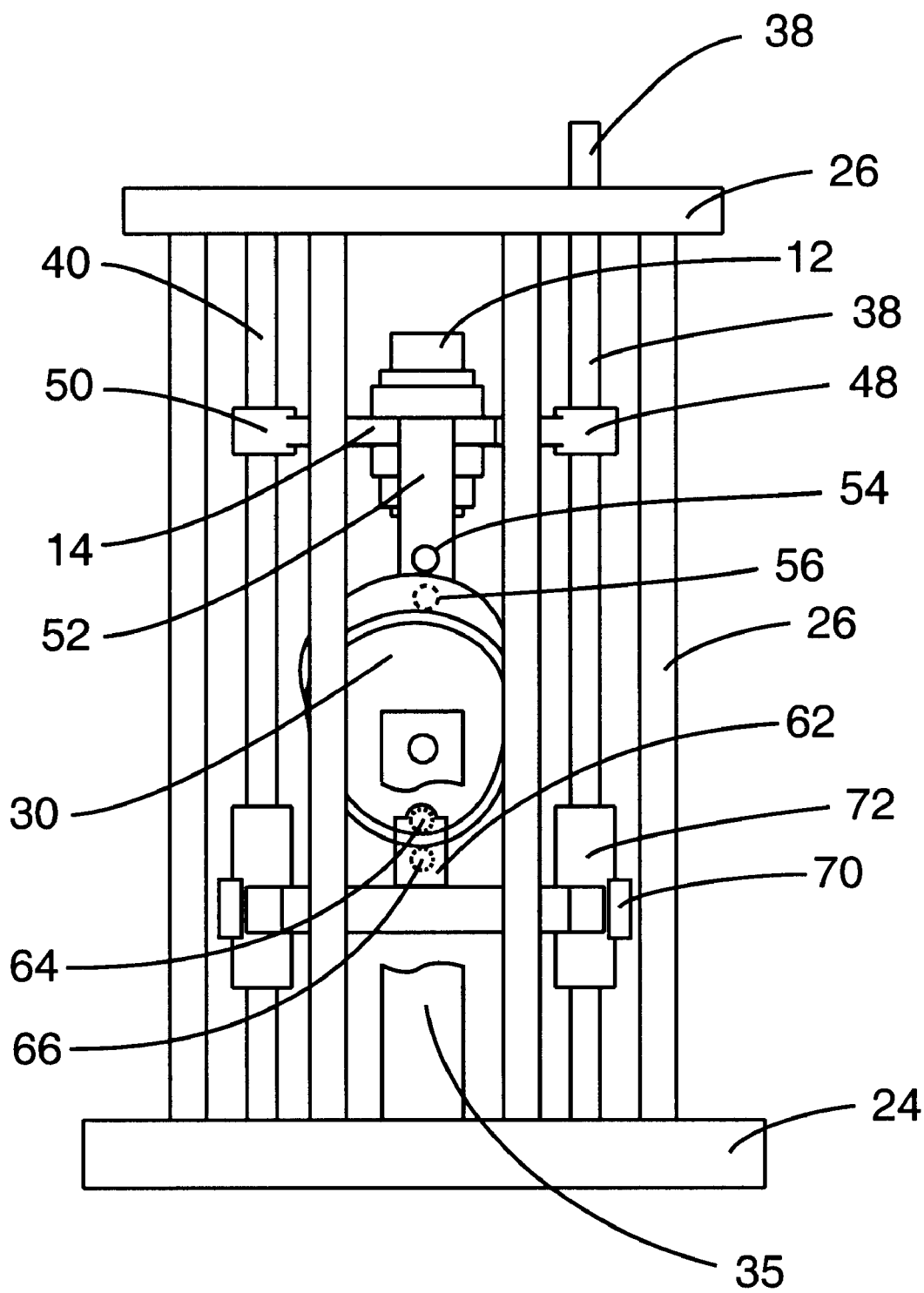
FIG. 2 is a side view of the gravimeter assembly shown in FIG. 1.

Referring now to FIGS. 1–5, the dropping chamber mechanism of the present invention, generally indicated by the numeral 10, is shown. The mechanism 10 operates to provide a falling body from which measurements of the local gravity may be made. The falling body is cyclically raised and released inside a dropping chamber (not shown), which is evacuated to eliminate any air resistance as is well known in the art. Such an evacuated dropping chamber is well known to those skilled in the art and does not form a part of the present invention, the thrust of which is to create the free fall of a dropped object while eliminating or reducing any deleterious effects associated with prior art devices such as disturbances caused by weight displacement, rotation of the dropping object, etc. Also, a substantially increased data rate is obtained using the device of the present invention.

The falling body can be a measuring mass 12 which contains a corner cube (not shown) of a Michelson interferometer. The measuring mass 12 is placed on, but not secured to, a carriage 14 which is cyclically raised and lowered in a manner that allows for at least some of the downward travel of the measuring mass 12 to be in free fall. The corner cube allows for rotation insensitive measurement to be made of the free fall of the measuring mass 12 since a corner cube (or corner mirror) has an optical center, a point about which it may be rotated without altering the optical path of the measuring beam. The arrangement of the Michelson interferometer, as well as the general arrangement of a gravimeter assembly which may be utilized with the free fall dropping chamber mechanism of the present invention do not form a part of the present invention but would be apparent to one of ordinary skill in the art.

The primary object of the invention is to provide a falling object or measuring mass 12 from which the local acceleration due to gravity may be measured. To that end, an assembly is provided having a main body 20 having a plurality of vertical support rods 22, a base 24, and a top support member comprising concentric rings 26, 28. The measuring mass 12, and the mechanism for raising and lowering the measuring mass 12 is disposed interiorly of the vertical support rods 22 and includes a mass balanced cam 30 which serves as the primary actuator of the mechanism and which is rotatably driven by a drive shaft 32 which may be connected to a DC motor (not shown) or other suitable drive means. The shaft 32, which is supported by a pair of posts 33, 35 having axially aligned bores through which the shaft 32 is inserted, is rotated at a constant speed appropriate to the contour of the cam 30 and the known value of the local acceleration due to gravity, as will be explained later. A pair of vertical rods or guide rails 38, 40 secured at the top end to ring 28 and at the bottom end to the base 24 allow for relatively rotation free vertical movement of the carriage 14.

The carriage 14 also includes a pair of cylindrical bearings 48, 50 extending therefrom and having axial bores, the bearings 48, 50 being slidably disposed about guide rails 38, 40. A connecting member 52 securely fastened to the carriage 14 has a pair of roller bearings 54, 56 disposed on either side of interior lip 58 and rollingly engaged therewith. All bearings, including bearings 54 and 56 are preferably lubricated.

A compensating mass 60 is connected to the cam 30 by a connector 62 having a pair of roller bearings 64, 66 rollingly engaged on either side of the exterior facing lip 68 of cam 30. The compensating mass 60 includes a pair of integral clamps 70 securely fastened about cylindrical bearings 72 which are slidably engaged with vertical guide rails 38, 40 thereby allowing for smooth vertical movement of the mass 60. The compensating mass 60 is chosen to be almost exactly the same weight as the combined weight of the carriage 14 and the measuring mass 12 so as to compensate for the mass displacement which occurs during downward movement of the carriage 14.

Thus the vertical position of the carriage 14 varies with the angular position of the cam 30, the radii and rotation rate of the cam 30 being chosen to cause a free fall of the measuring mass 12. In order to accomplish this, the radii of the cam 30 and the rotation speed must be chosen so that the carriage 14 is accelerated briefly to a velocity which causes separation from the measuring mass 12. The separation is then sustained for a sufficient amount of time to allow for the measurement of the rate at which the mass 12 falls and hence the local acceleration due to gravity. It can be appreciated by those skilled in the art that it is desirable to provide a gravimeter which can make a plurality of measurements within a relatively short time, and thus, given that only one measurement can be taken during each instance of free fall, it is desirable to maximize the rotational period of the cam 30 which also minimizes the size of the apparatus. This implies a relatively small cam 30. It can be readily appreciated that the physical size of the entire apparatus 10 is minimized.

Figure 4:
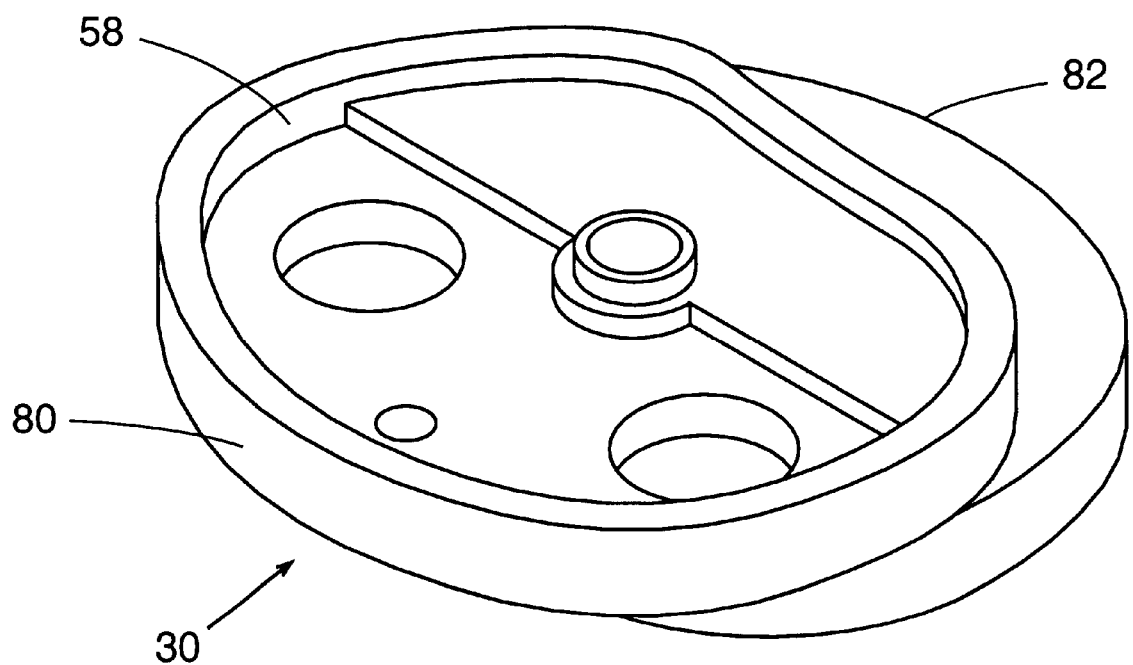
FIG. 4 is a perspective view of the cam actuator of the gravimeter assembly.
Figure 5:
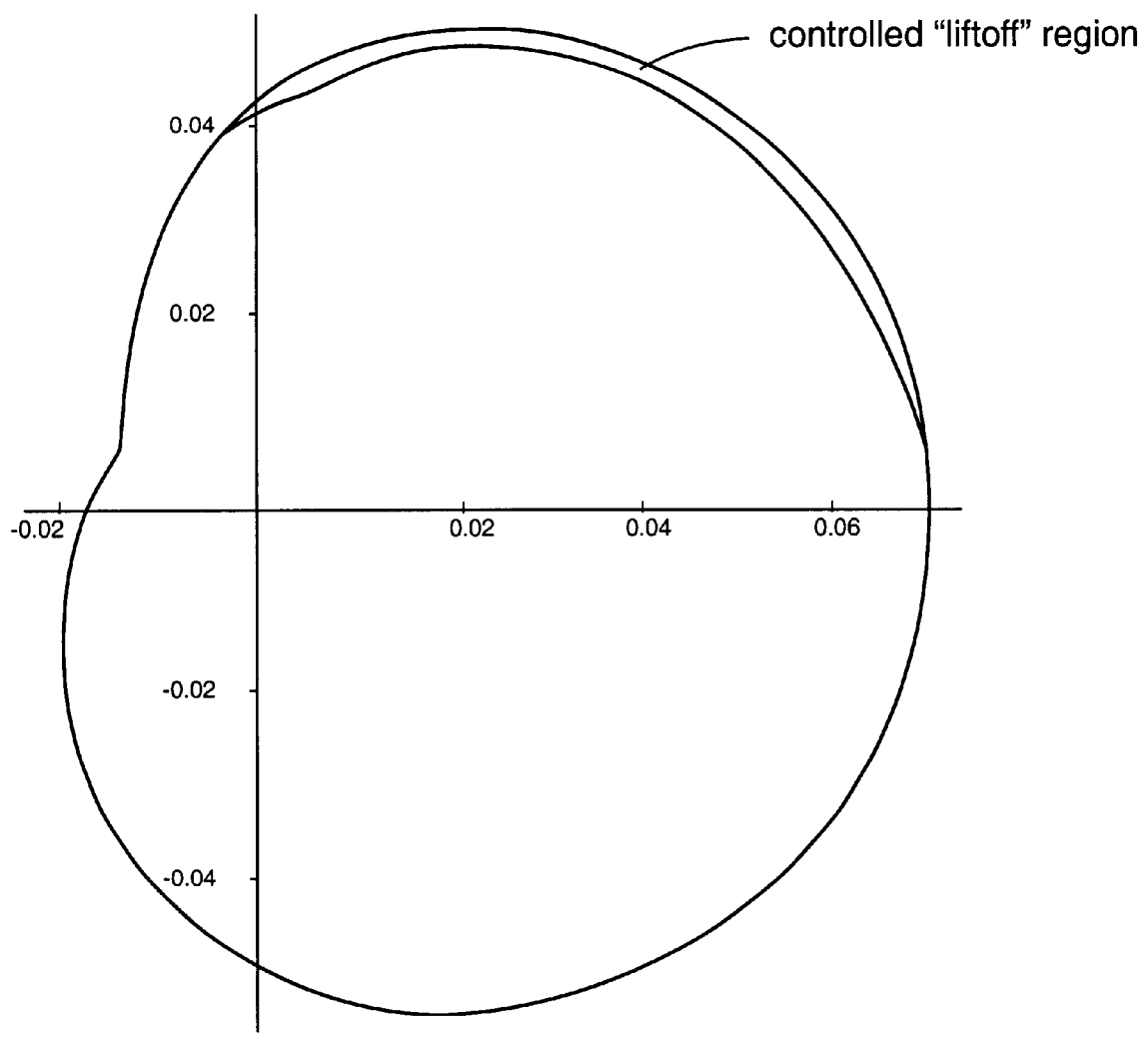
FIG. 5 shows a plan view of the cam actuator detailing the interrelation between cam movement and free fall of the measuring mass.

Referring particularly to FIGS. 4 and 5, the cam 30 is shown in more detail. It can be seen that the cam 30 essentially has two nearly identical cam surfaces, 80, 82, with corresponding oppositely facing lips 58, 68 which engage roller bearings 54, 56, 64, 66 to effect alternating vertical movement of the carriage 14 and compensating mass 60. That is, as cam 30 rotates, the carriage 14 and compensating mass 60 move in opposite directions along guide rails 38, 40. The cam 30 is of unitary construction and may be fabricated using a numerical control milling machine. Cam surface 80 controls the movement of the carriage 14 and causes free fall of the measuring mass 12. Cam surface 82, which is displaced from cam surface 80 by 180 degrees, controls the compensating vertical movement of compensating mass 60. The portion of the cam defined by cam surface 82 is weighted to provide a compensating mass to cancel the weight differential created by the free fall of the measuring mass 12. It can be appreciated by those skilled in the art that the weight differential created when the mass 12 is in free fall would cause a very slight recoil or displacement of the entire assembly which would have a deleterious effect on the accuracy of the measurement. Thus, it is desirable to provide a compensating mass to eliminate any free-fall caused weight change. In the present invention, both mass displacement and vibration are effectively eliminated by the combination of compensating cam 82 and compensating mass 60.

The radii of the cam surface 80 may be characterized by the following equations:

$k=0.08-0.034014167-(0.0217690670.03/0.032)$
$y=0.021769067(20/80)^2$ where k and y are constants which are a function of g.

Figure 3:
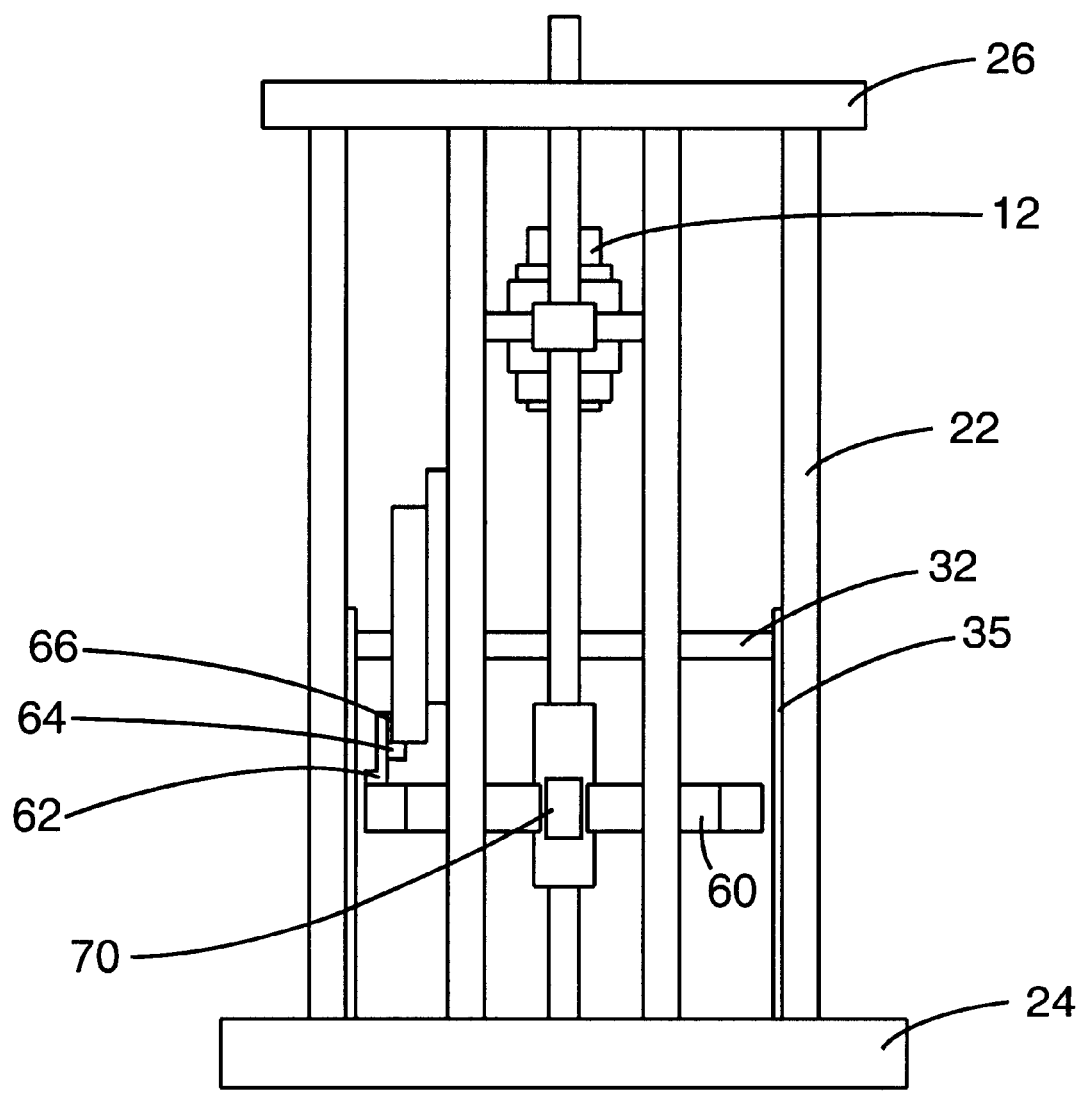
FIG. 3 is a front view of the gravimeter assembly shown in FIG. 1.

$r1[\phi]:=0.0.08-0.002-0.021769067(\phi/80)^2$ where r1 is the cam radius at the controlled lift off region, from 20 to 80 degrees of rotation as indicated in FIG. 3, and $\phi$ is the angle of rotation. It should be noted that c1 is the actual circumference of the cam 30 at the lift off region and c2 is the grave-curve or the actual path of the center of mass of the measuring mass 12.

$r2[\phi]:=k+(0.0217690670.03/0.032)((\phi-180/60)^2$, for $\phi=100-160$ degrees. This is the soft catch portion of the cam 30 rotation where the measuring mass 12 gradually catches up to the carriage 14. At 160 degrees, free fall of the measuring mass 12 is ended as the mass 12 will rest on the carriage 14.

$r3[\phi]:=k+(0.08-k)0.5((\phi-160)/180)^2$, for $\phi=160$ to 260 degrees, and $r4[\phi]:=0.08-(0.08-k)0.5((360-\phi)/100)^2$, for $\phi=260$ to 360 degrees.

r5, which characterizes the grave-curve, may be expressed as follows:

$r5[\phi]:=0.08-0.021769067(\phi/80)^2$.

$r011[\phi]$ and $r021[\phi]$ are the radii of the cam for $\phi$ from 0 to 10 degrees, and 10 to 20 degrees, respectively. These are the radii of the cam 30 during acceleration of the carriage 14 to the liftoff velocity and may be expressed as follows:

$r011[\phi]:=0.08-0.001(\phi/10)^2-0.021769067(\phi/80)^2$;
$r021[\phi]:=0.08-0.021769067(\phi/80)^2-0.002+0.001((20-\phi)/10)^2$.

Finally we have, $r102[\phi]:=0.08-0.002-0.021769067(\phi/80)^2+0.001((80-\phi)/10)^2$; for $\phi=80-90$ degrees;

$r103[\phi]=0.08-0.021769067(\phi/80)^2-0.001((100-\phi)/10)^2$; for $\phi=90-100$ degrees.

It can be readily appreciated that the above described radii are measured from the axis of rotation of the cam 30.

In order to reduce the overall size and weight of the gravimeter containing the mechanism of the invention, the cam 30 size is chosen to have a diameter of approximately 15 cm, which is dictated by the length of free fall and allowable (about 2.5 g) deceleration together with a return to start motion which purposely never exceeds 1 g, where g is the known local acceleration due to gravity. With this cam 30 size, the length of free fall is about 2 cm. The rotation rate of about 0.3 seconds per rotation allows for three measurements per second which is relatively fast compared to conventional gravimeters. It should be noted that the free fall time, the deceleration time, and the return to start time must equal the cam's rotational period.

The motor speed required depends on what the local g is, which is known. Thus a fine adjustment of motor speed is required, and to that end, a suitable adjustment means, i.e., a potentiometer, is required. The adjustment is required to ensure that a cam 30 shape calculated in accordance with the above equations creates an appropriate lift off and causes the support carriage to fall appropriate to the local value of g.

In operation, the shaft 32 and cam 30 are rotated at the 0.3 seconds per rotation rate, causing the measuring mass 12 to separate from the carriage 14 once per rotation. When the measuring mass 12 is in free fall, measurements of its rate of descent can be made by the interferometer apparatus. As the carriage 14 is moving down, compensating mass 60 travels upward thus canceling any disturbance caused by the weight displacement of the carriage 14. Likewise, as the measuring mass 12 is in free fall, cam 30, which is balanced so that the portion of the cam 30 defined by cam surface 82 is moving upwards and is displacing a weight equivalent to the weight of the measuring mass 12.

Free fall commences after the carriage 14 (has experienced an initial acceleration of about 2.5 g, the acceleration being caused by the shape of the cam surface 80 just prior to the lift off region as shown in FIG. 3.

It is to be understood that the provided illustrative examples are by no means exhaustive of the many possible uses for this invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

I claim:

1. A gravimeter mechanism contained within a dropping chamber for periodically causing the free fall of an object, said mechanism comprising:

a support frame including a base;

a carriage having a horizontal surface upon which said object may be supported, said carriage supported for reciprocating vertical movement by said support frame;

a cam member, said cam member rotatably supported by a drive shaft supported by said support frame, said cam member having first and second cam surfaces, the cam surfaces defining two mass balanced portions of said cam member, the first one of said cam surfaces operably connected to said carriage for causing alternating vertical movement of said carriage in response to rotation of said drive shaft.

2. The mechanism of claim 1 wherein said first cam surface has varying radii, the variation in the radii of said first cam surface is chosen to effect an initial downward acceleration of said carriage sufficient to cause said object to be in free fall during downward travel of said carriage.

3. The mechanism of claim 2 wherein said downward travel of said carriage in response to rotation of said cam member is further characterized by a controlled deceleration period following the acceleration, said controlled deceleration period effecting a soft catch of said object.

4. The mechanism of claim 1 wherein said support frame includes an opposing pair of guide rails secured to said base, said carriage having a pair of cylindrical bearing members extending therefrom and slidably secured about respective ones of said guide rails.

5. The mechanism of claim 1 wherein said object contains a corner cube serving as a mirror of a Michelson interferometer.

6. The mechanism of claim 1 wherein said cam further has interior and exterior surfaces, said first cam surface having a lip extending interiorly therefrom and rollingly engaged with connection means extending from said carriage.

7. The mechanism of claim 1 wherein said second cam surface has a lip extending exteriorly therefrom and rollingly engaged with connection means extending from a compensating mass whereby said compensating mass is displaced in a direction opposite said object to cancel out weight changes produced by said object during free fall.

8. The mechanism of claim 7 wherein said compensating mass has at least a pair of cylindrical bearings extending therefrom, said cylindrical bearings slidably disposed about a corresponding pair of vertical support members secured to and extending from said base whereby said compensating mass is constrained to move in a vertical path.

* * * * *